June 18, 1929.  J. J. CROWE  1,718,192
TORCH APPARATUS
Filed Oct. 18, 1927   3 Sheets-Sheet 1

June 18, 1929.                J. J. CROWE                  1,718,192
                             TORCH APPARATUS
                         Filed Oct. 18, 1927        3 Sheets-Sheet 2

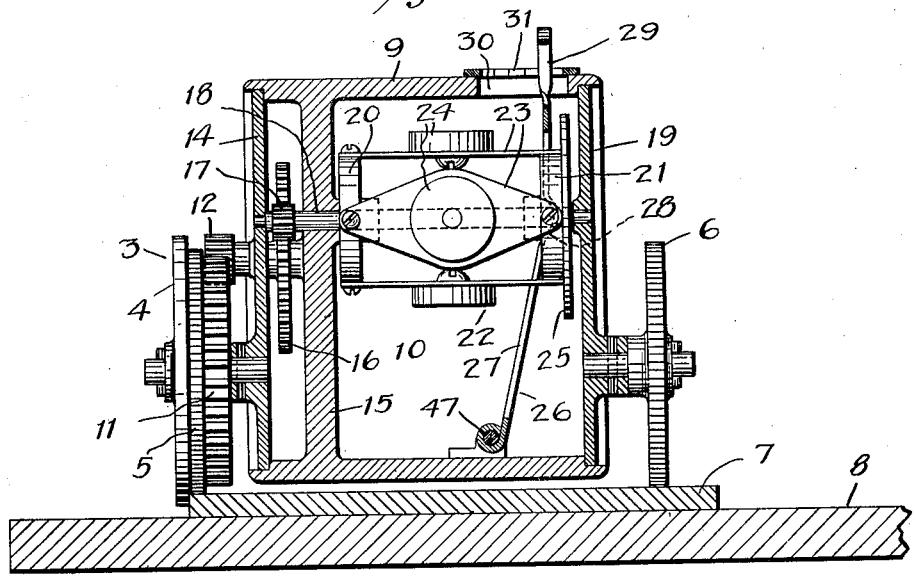
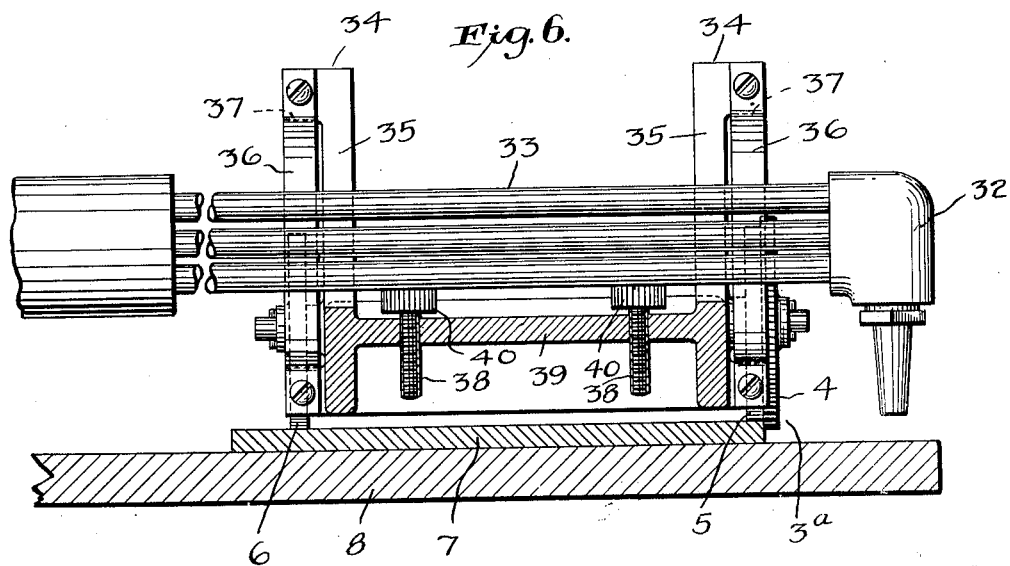

Patented June 18, 1929.

1,718,192

UNITED STATES PATENT OFFICE.

JOHN J. CROWE, OF WESTFIELD, NEW JERSEY, ASSIGNOR TO AIR REDUCTION COMPANY, INCORPORATED, OF NEW YORK, N. Y., A CORPORATION OF NEW YORK.

TORCH APPARATUS.

Application filed October 18, 1927. Serial No. 226,877.

The invention relates to apparatus for use with oxyacetylene and like torches, and a particular object is to provide an inexpensive, convenient, and self-contained device for mechanically supporting and guiding a cutting torch and for enabling the operator to advance the same by hand at desired speeds.

The invention comprises a portable wheeled torch carriage which is propelled by direct hand pressure, yet with which the cutting speed is accurately governed and regulatable for a considerable range of cutting speeds by means included in the carriage and connected with the wheel support so as to be operated therefrom.

The invention also comprises a wheeled torch carriage with at least three points of support, so constructed as to receive and hold an ordinary angle-head hand torch, preferably laid crosswise of the carriage. Adjustable rest means are provided for raising and lowering the torch thus carried, or for inclining it lengthwise in order to vary the angularity of the jets in a direction transverse to the line of work. In the preferred embodiment the handle or shank of the torch is made to serve as a handle for the operator to grasp for pushing the carriage to advance the cut.

Another feature of the invention enables the carriage to be guided on a simple supporting plate or board, the wheels at one side of the carriage being provided with flanges at the outer side to be kept in contact with the edge of the plate, while the wheels at the opposite surface run on the surface of the plate. The carriage can also travel on the surface of the work itself.

These and other features and objects of the invention will become apparent as the specification proceeds.

In the accompanying drawings forming part hereof:

Figure 1:
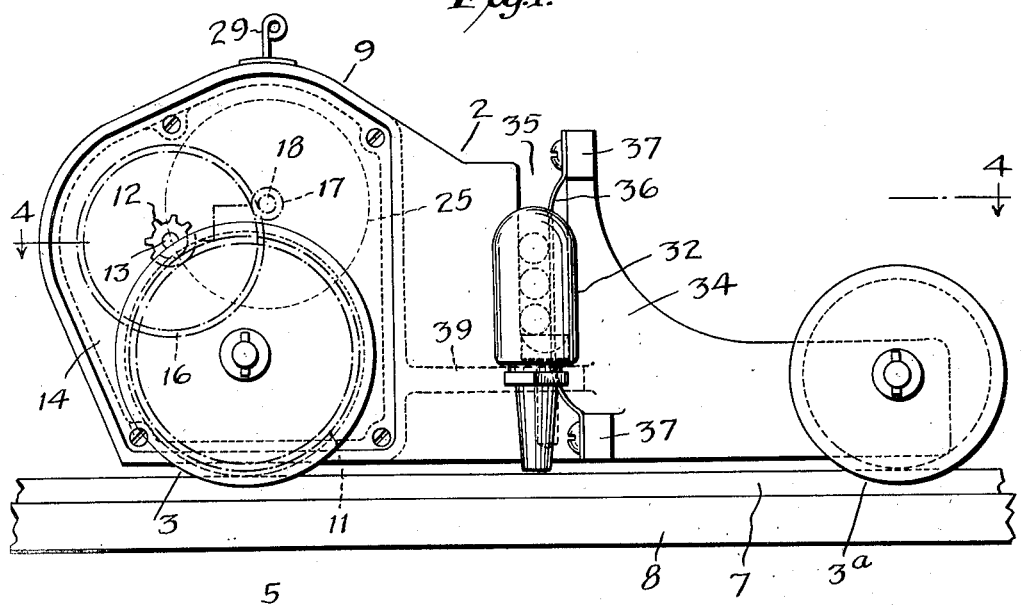
Fig. 1 is a side elevation of the carriage with a torch therein.
Figure 2:
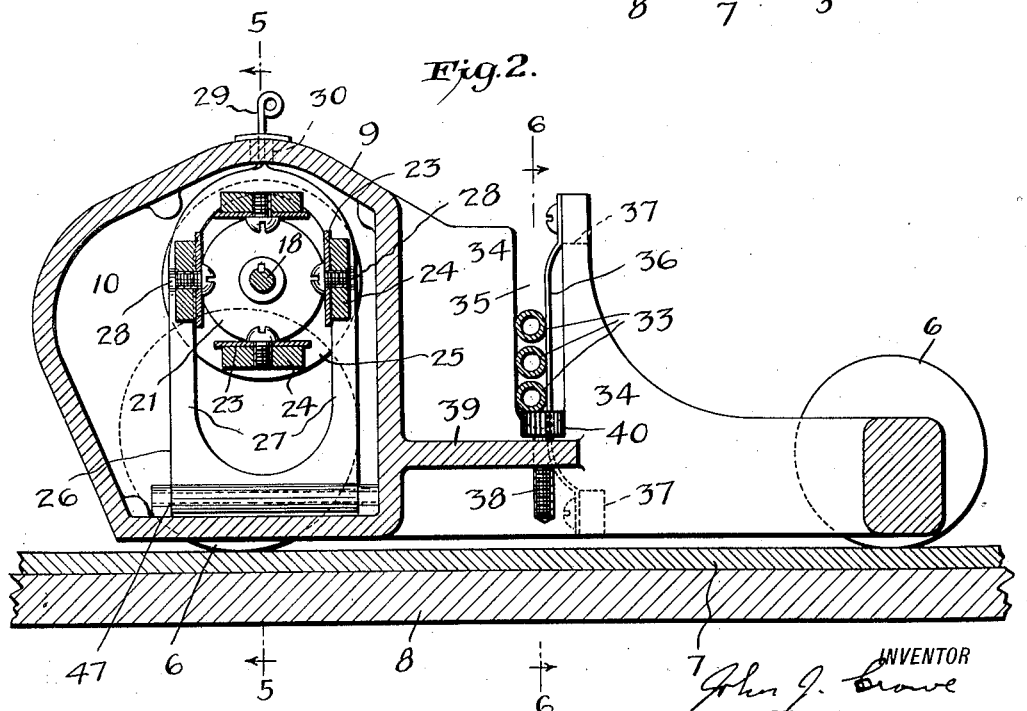
Fig. 2 is a vertical longitudinal section.
Figure 3:
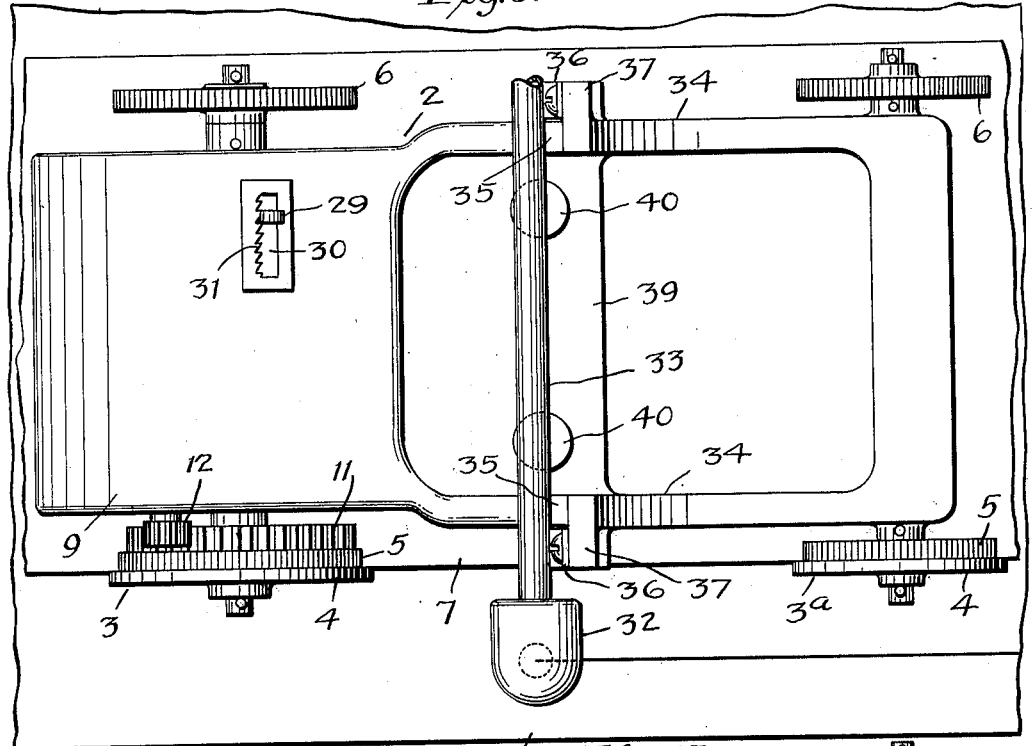
Fig. 3 is a plan view.
Figure 4:
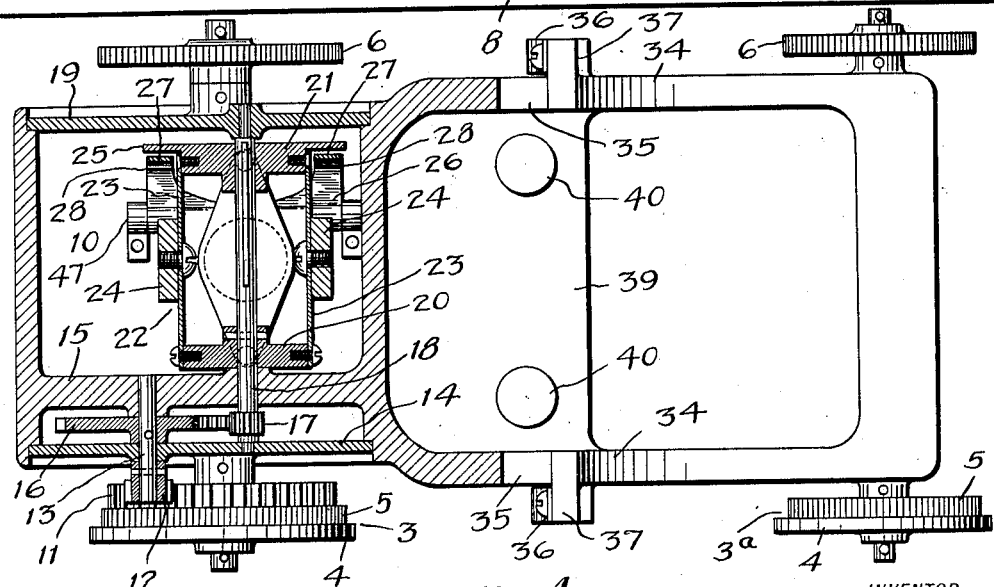

Fig. 4 is a horizontal section on the line 4—4 of Fig. 1, and indicating the line of cut; and Figs. 5 and 6 are vertical transverse sections taken on the lines 5—5 and 6—6, respectively, of Fig. 2.

The numeral 2 designates the body of a small, readily portable wheeled carriage. The carriage is shown provided with four wheels located approximately at the corners, two wheels on each side, but the number and specific location of the points of support may be varied. The two wheels marked 3 and $3^a$, located at one side, are advantageously provided with flanges 4 at the outer sides, of greater diameter than the tread portions 5 of these wheels. The wheels 6 at the opposite side preferably do not carry such flanges. The flanges 4 enable the carriage to be guided on any suitable guide plate or board 7, in lieu of special tracks, the operator as he advances the carriage simply keeping the flanges 4 against the edge of the plate. The plate 7 is shown resting on the metal plate or sheet 8 to be cut, but obviously the guide plate might be supported somewhat above the work. The wheels are also adapted to run on the surface of the work itself. In that event the flanges 4 on the wheels at one side would cause the carriage to be tilted slightly to one side, but that would not be of consequence.

The carriage has an enclosed and somewhat elevated fore part 9, housing a chamber 10. The forward wheel marked 3 has a large spur gear 11 formed or fixed with it, and this gear meshes a pinion 12 on the outer end of a shaft 13, this shaft passing through a cover plate 14 and into an inner wall 15, whereby the shaft is rotatably supported. A gear wheel 16 on the inner part of said shaft meshes a pinion 17 on a shaft 18, which is journaled at its opposite ends in the cover plate 14, or the wall 15, and in a cover plate 19 at the opposite side of the fore part 9, this latter plate enabling the chamber to be opened.

The shaft 18 carries the fixed and slidable collars 20 and 21 of a centrifugal, frictional speed governor 22, the collar 20 being fixed to the shaft and the collar 21 being slidably keyed thereon. The opposite ends of springs 23, carrying centrifugal weights 24, are secured to the respective collars.

The collar 21 has a flange 25 which is adapted to be drawn into frictional contact with a cooperating retarding element 26 of the governor. As shown in Fig. 2, this element is desirably in the form of a yoke or plate having a large interior opening, the sides or limbs 27 of the yoke passing at opposite sides of the rotatable governor parts, and being bent intermediate their ends to present two noses 28 at opposite sides of the axis for frictional contact with the flange 25.

The lower end of the member 26 is pivoted at 47. The upper end has a finger 29, which projects upward through a slot 30 in the top of the chamber, where it cooperates with suitable retaining teeth or notches 31, the finger being tensioned to remain in engagement with any notch but permitting the speed to be readily regulated by shifting the finger by hand from one notch to another. An accessible speed control is thus provided, which the operator can adjust with one hand while advancing the carriage and torch by pressure of the other hand.

The drawing shows a standard hand cutting torch having a right-angled head 32. The torch is mounted on the carriage by laying its handle or shank 33, composed of the usual oxygen and combustible gas conduits, transversely of the carriage in a seat provided for the purpose. This seat is advantageously arranged behind the fore part 9, at a region intermediate the front and rear supports of the carriage.

At this region the side walls 34 of the carriage are slotted downward from the top, at 35, for a suitable distance, and spring presser bars 36 are secured at their upper and lower ends to lugs 37 so as to press the torch shank firmly against the front walls of the slot, while permitting the torch to be easily introduced and removed.

Means are likewise provided at the seat for supporting the torch shank higher or lower, to secure the proper distance between the torch tip and the work, or to enable the torch to be tilted endwise, in order to incline the tip relatively to the carriage and transversely of the line of progress, if, for example, a scarf cut is desired. Two screws 38 adapted to be screwed up and down in tapped holes in a shelf 39 serve well as adjustable rests, the screws being spaced apart toward opposite sides of the carriage, and their heads 40 being adapted to support the torch shank from beneath. Adjustment of these rests to different heights relatively to each other not only provides for making scarf cuts, but also makes it possible to compensate for tilting of the carriage if the latter should be operated directly on the metal to be cut, or for an angularity of the torch head other than ninety degrees. The torch head and tip can be moved out or in with respect to the side of the carriage by sliding the shank lengthwise in the seat.

The construction is also preferably such that the shank of the torch may serve as a handle for the operator to grasp for pushing the carriage. For this purpose the region of the carriage including the torch seat and extending for some distance forward from the seat, and rearward from the seat to the back end of the carriage, is made open from the top downward, and from side wall to side wall, so as to afford room for the hand applying the propelling pressure. Also, the rear part of the carriage is preferably made low as shown.

The use and operation of the carriage will be understood from the foregoing description. The cutting is manual in the sense that the torch is moved by hand, but the accurate supporting and guiding of the torch is mechanical, and the even motion of the torch results automatically from the action of the governor, which in turn is driven from or connected with the rolling support of the manually propelled carriage. I do not necessarily limit myself to the particular kind or class of governor, or to a governor which performs the entirety of the function of the governor illustrated. Various forms of inertia or retarding devices geared or connected to the wheel support, and capable of smoothing the motion and assisting the operator in maintaining a desired speed, might be employed instead of the one shown. A speed governor which automatically limits the speed to the desired maximum, or which by the feel causes the operator readily to maintain that speed, as well as keeping the motion even, and which can be regulated for any desired speed of cutting, is, however, the kind of governor that is particularly contemplated. It is possible, for example, with such a governor operated as shown and having its speed control 29 placed accessibly for adjustment while the cut is being made, for the operator to readily and appropriately slow the speed of the torch toward the finish of the cut, in order to insure cutting through the lower corner. In this connection it will be understood that when the cutting oxygen supply is so regulated as to secure the most economical cutting during the principal portion of the cut there is a considerable drag which at the final end of the cut would leave the lower corner unsevered, if the speed were not appropriately reduced.

It is not necessary, of course, for the governor to be geared directly to one of the wheels. Numerous changes in form, proportions, details and arrangement, and by way of substitution, addition or omission, may be made without departing from essentials.

The invention is primarily a hand propelled device capable of approximating the results of more expensive motor operated equipment, and the plan which permits of the employment of regular hand torches is an important element in the general purpose of providing at low cost an apparatus to enable excellent and economical work to be performed by even unskilled operators. Evidently, however, the construction for receiving a hand torch might be applied to motor-driven carriages.

The apparatus might be used for certain welding operations, by employing a welding torch and making appropriate modification if necessary in the torch receiving or holding means, but the particular field of the invention is in cutting operations with oxyacetylene, oxyhydrogen or like gases.

I claim:

1. A torch apparatus, comprising a portable torch carriage provided with wheel support, said carriage designed to be propelled by hand pressure to advance the torch, and a speed governing device on the carriage and connected so as to be driven from the wheel support, for governing the speed at which the carriage and torch are manually advanced.

2. A torch apparatus, comprising a portable torch carriage provided with wheel support, said carriage designed to be propelled by hand pressure to advance the torch, and a speed governing device on the carriage and connected so as to be driven from the wheel support, for governing the speed at which the carriage and torch are manually advanced, said device having a control capable of affording a speed range necessary for torch operations and provided with a manual controller accessibly located on the carriage.

3. A torch apparatus, comprising a portable torch carriage provided with wheel support, said carriage designed to be propelled by hand pressure to advance the torch, and a centrifugal frictional speed governor on the carriage and connected so as to be driven from the wheel support, for governing the speed at which the torch and carriage are manually advanced.

4. A cutting torch apparatus, comprising a portable torch carriage provided with wheel support, said carriage designed to be propelled by hand pressure to advance the torch, and automatic speed governing means on the carriage and connected with the wheel support so as to be driven therefrom, combined with cutting-speed control means also on the carriage for governing and regulating the speed at which the supported and manually propelled torch will cut.

5. A portable wheeled torch carriage with at least three points of support, said carriage having portions separated by a vertical transverse slot forming a seat to receive a torch laid crosswise of the carriage in said slot.

6. A portable wheeled torch carriage with at least three points of support and designed to be propelled by hand pressure, a speed governor and gearing for driving the same from the wheel support, said carriage having a fore portion carrying said governor and gearing, and a seat in the intermediate portion of the carriage to receive a torch laid crosswise of the carriage.

7. A portable wheeled torch carriage with at least three points of support, said carriage having a seat to receive a torch laid crosswise of the carriage, the region of the seat being recessed so as to enable the operator to grasp the torch intermediate the sides of the carriage as a handle for pushing the carriage to advance the torch.

8. A portable wheeled torch carriage with at least three points of support, said carriage having a seat to receive a torch laid crosswise of the carriage, an adjustable rest for the torch at the seat, and yielding means adapted to press against the side of the shank of the torch to keep it firm in the seat.

9. A portable wheeled torch carriage with at least three points of support, said carriage having a seat to receive a torch laid crosswise of the carriage, and adjustable transversely spaced rest screws at the seat enabling the torch to be raised and lowered or inclined.

JOHN J. CROWE.